United States Patent [19]

Fisher et al.

[11] Patent Number: 5,835,896
[45] Date of Patent: Nov. 10, 1998

[54] METHOD AND SYSTEM FOR PROCESSING AND TRANSMITTING ELECTRONIC AUCTION INFORMATION

[75] Inventors: Alan S. Fisher, Fremont; Samuel Jerrold Kaplan, Hillsborough, both of Calif.

[73] Assignee: Onsale, Inc., Menlo Park, Calif.

[21] Appl. No.: 623,654

[22] Filed: Mar. 29, 1996

[51] Int. Cl.$^6$ .................................................. G06F 15/300
[52] U.S. Cl. .................................................. 705/37; 705/27
[58] Field of Search .................................. 395/201, 226, 395/227, 237, 244, 240; 283/56; 340/825.26, 825.27, 825.28, 825.29; 902/22, 24; 379/91–93; 705/1, 26, 27, 37, 44

[56] References Cited

U.S. PATENT DOCUMENTS

| | | | |
|---|---|---|---|
| 3,581,072 | 5/1971 | Nymeyer | 395/237 |
| 4,677,552 | 6/1987 | Sibley, Jr. | 395/237 |
| 4,799,156 | 1/1989 | Shavit | 395/226 |
| 4,903,201 | 2/1990 | Wagner | 395/237 |
| 5,063,507 | 11/1991 | Lindsey et al. | 395/226 |
| 5,101,353 | 3/1992 | Lupien et al. | 395/237 |
| 5,136,501 | 8/1992 | Silverman et al. | 395/237 |
| 5,168,446 | 12/1992 | Wiseman | 395/237 |
| 5,243,515 | 9/1993 | Lee | 395/237 |
| 5,258,908 | 11/1993 | Hartheimer et al. | 395/237 |
| 5,305,200 | 4/1994 | Hartheimer et al. | 395/237 |
| 5,325,297 | 6/1994 | Bird et al. | 395/792 |
| 5,329,589 | 7/1994 | Fraser et al. | 379/91 |
| 5,375,055 | 12/1994 | Togher et al. | 395/237 |
| 5,394,324 | 2/1995 | Clearwater | 395/208 |
| 5,426,281 | 6/1995 | Abecassis | 235/379 |

FOREIGN PATENT DOCUMENTS

| | | |
|---|---|---|
| 2 658 635 A | 8/1991 | France . |
| 9 300 266 A | 9/1994 | Netherlands . |
| WO 92 15174 A | 9/1992 | WIPO . |
| WO 96 34356 A | 10/1996 | WIPO . |

OTHER PUBLICATIONS

"Onsale: Onsale brings thrill of Auctions and Bargin hunting online; unique internet retail service debuts with week–long charity auction for the Computer Museum in Boston", Business Editors/Computer Wriuters, May 24, 1995, Dialog file 610, Accession No. 0489267.

Dialog(R) File 610:Business Wire (c) 1997 Business Wire, "Onsale: Onsale Brings Thrill of Auctions and Bargain Hunting Online: Unique Internet retail service debuts with week–long charity auction for The Computer Museum in Boston", Mountain View, CA, May 22, 1995.

Dialog(R) File 16:Promt(R) (c) 1995 Information Access Co., "Car auction reaches into space", Automotive News, Nov. 25, 1991, p. 6.

Dialog(R) File 609:KR/T Bus. News (c) 1995 Knight–Ridder/Tribune Bus News., "California Computer Auctions No Boon For Bargain Hunters", Sep. 13, 1993, by Tom Schmitz, San Jose Mercury News, Calif.

*Primary Examiner*—Frantzy Poinvil
*Attorney, Agent, or Firm*—Adam H. Tachner; Crosby, Heafey, Roach & May

[57] ABSTRACT

A system and method for conducting a multi-person, interactive auction, in a variety of formats, without using a human auctioneer to conduct the auction. The system is preferably implemented in software. The system allows a group of bidders to interactively place bids over a computer or communications network. Those bids are recorded by the system and the bidders are updated with the current auction status information. When appropriate, the system closes the auction from further bidding and notifies the winning bidders and losers as to the auction outcome.

4 Claims, 12 Drawing Sheets

FIG. 1

Cordless 10-Channel Phone Model 5400

List Price: $129.95
Minimum Bid: $1.00
Bid Increment: $2.00
Quantity Available: 16

Auction closes on Fri Mar 29, 1996 1:00 PST.
Sales Format: <u>Dutch Auction</u>

The current high bidders are:

- ☐ NY of Reno, NV, Tue Mar 26, 3:27 pm ($25.00, 1)
- ☐ PM of Petersburg, VA, Tue Mar 26, 4:18 pm ($19.00, 1)
- ☐ NA of Corinth, TX, Tue Mar 26, 3:43 ($17.00, 1): "FOR THE WIFE"
- ☐ MN of Grand Prairie, TX, Tue Mar 26, 4:24 pm ($17.00, 1)
- ☐ RD of Cambridge, MA, Tue Mar 26, 2:43 ($15.00, 1)
- ☐ BC of St Laurent, PQ, Tue Mar 26, 2:52 pm ($15.00, 1)
- ☐ JF of Scranton, PA, Tue Mar 26, 2:59 pm ($15.00, 1)
- ☐ CC of Evansville, IN, Tue Mar 26, 3:01 pm ($15.00, 1)
- ☐ DP of Columbia, SC, Tue Mar 26, 3:12 pm ($15.00, 2)
- ☐ LR of Gainesville, FL, Tue Mar 26, 3:40 pm ($15.00, 1)
- ☐ RR of Washington, NC, Tue Mar 26, 3:15 pm ($13.00, 1)
- ☐ FW of University Park, PA, Tue Mar 26, 4:29 ($9.00, 1)
- ☐ DB of Evansville, IN, Tue Mar 26, 2:45 pm ($5.00, 1)
- ☐ SK of Goshen, KY, Tue Mar 26, 2:59 pm ($5.00, 2 out of 16)

Item #1918.

This Factory Reconditioned Cordless Phone Model 5400 Features:

- ☐ Clarity Plus, circuitry for virtually static-free reception
- ☐ 10-Channel selection
- ☐ 9-Number memory
- ☐ Lighted Dial
- ☐ Handset holds charge for up to 7 days
- ☐ Available in Two-tone Gray

FIG. 2

Cordless 10-Channel Phone Model 5400

NOTICE: It is a violation of law to make bids in a false name or with an invalid credit card, even if the software initially accepts such a bid. Please be aware that even if you do not give us your real name, your web browser transmits a unique internet address to us, which can be used by law enforcement officials to identify you.

Minimum Bid: $1.00
Bid increment: $2.00

Bid (price not to exceed):
              Quantity:

The quantity you request may not always be available. Click here if you are not willing to accept a reduced quantity. ☐

Applicable sales tax, if any, will be added to your order.

If you enter your ONSALE account number, you only need to enter your first name (for security) in the Shipping Address area below.

Account Number: (Optional)
Shipping Address:
      First Name:
      Last Name:
        Street1:
        Street2:
          City:
  State/Province:
      Zip Code:
       Country:
   Email Address:
   Daytime Phone:
Nighttime Phone:
          FAX:

Your credit card number is required to quarantee your bid. Your card will not be charged unless your bid is successful. Only Visa and MasterCard cards are accepted.

Credit Card #:
Expiration Date: Month (e.g. "07") Year

(Optional) Credit card billing address if different from shipping address:

Name as on Card:
        Street1:
        Street2:
          City:
  State/Province:
      Zip Code:
       Country:

(Optional) You can enter a comment for display on screen with your bid.
      Comment:
Click here if you do not want ONSALE to keep you informed of current high bids via electronic mail. ☐    2 — [PLACE BID]    [CLEAR FORM]

METHOD AND SYSTEM FOR PROCESSING AND TRANSMITTING ELECTRONIC AUCTION INFORMATION

BACKGROUND OF THE INVENTION

1. Field of the Invention

The present invention relates generally to electronic commerce and more particularly to conducting an interactive auction over an electronic network.

2. Description of the Related Art

Auctions usually take the form of a physical gathering of bidders assembled together within an auction house. Auctions presenting more valuable, collectible merchandise, such as art, coins and antiques, are often preceded by preparation of a catalog of merchandise, circulated to interested parties in advance of the gathering at the auction house, where bidding by those physically present will take place. For auctions of more mundane items, such as household possessions, estate sales and the like, the interested bidders simply appear at the appointed time and place and bid on merchandise in which they are interested.

Traditional auctions requiring a bidder's physical presence disadvantageously require that the merchandise lots up for sale be available at the auction venue for inspection by the bidders and subsequent pickup by the successful bidders. For many types of merchandise it would be far easier for both buyer and seller to leave the inventory at its original source and ship purchased items to the successful bidders at the end of the auction. Moreover, physical auctions have the still further disadvantage that only one item may be auctioned at a time. The auctioneer solicits bids from the floor for a given lot, but once the highest bid has been accepted, the lot is closed and the next lot brought forward. This sequential processing combined with the finite amount of time available to a gathered group is inherently limiting because multiple lots cannot be auctioned simultaneously to the same group of people during their limited period of availability.

Some changes in bidding requirements have made traditional auctions somewhat more convenient for bidders. Many auction firms allow bidders to submit their bids in advance of the auction. Advance bidding may be done by mail as a convenience to the bidders so that they do not have to be physically present at the auction. Also, the advent of the telephone and facsimile machine allowed bidders to submit bids in near real-time during the course of an auction. These technologies free the bidder from being physically present at the auction, thereby saving time and travel expense. To incorporate these technologies into the traditional auction format, representatives of the auction firm receive telephone or facsimile bids from their clients and alert the auctioneer of these new bids. Similarly, the representatives may relay information about the current bid items, such as the current high bid, back to the telephone bidders.

Bidding by mail or facsimile suffers a significant disadvantage as compared to bidding in person or by telephone because the mailing or faxing bidder has no opportunity to increase a bid in quick response to competitive bids received from the floor or by telephone. Moreover, although telephone bidding allows the bidder to avoid travel expense and inconvenience, traditional auctions may be scheduled at inconvenient times for many remote bidders. Also, because of the large number of items or lots sold in a typical auction, which can number in the eight hour period in order to be present when the few lots in which the bidder has an interest come up for sale. The lots in which the telephone bidder is interested may be scattered throughout the lengthy traditional auction. Time zone differences further diminish the appeal of telephone bidding for an international potential customer base.

All of these limitations and disadvantages of physical auctions, even when telephone bidding or bidding by facsimile is permitted, serve to discourage a large number of bidders and ultimately leads to lower selling prices to the economic detriment of the auctioneer and seller.

Electronic auctions held over the Internet using electronic mail (E-mail) have provided a minor innovation as compared to more traditional physical options. In E-mail auctions, an auction catalog is electronically mailed to people interested in bidding. Subsequently, bidders submit their bids on individual lots to an auctioneer via E-mail. The auctioneer reads the electronic mail bids and enters them in a database of bids. When the auction closes, the auctioneer notifies the winning bidders, usually via electronic mail, and ships the merchandise to the winning bidders.

There are several disadvantages to E-mail auctions. First, a human auctioneer is required to prepare the auction catalog and to read and process the electronic mail bids. This takes a considerable amount of effort in a large auction. Secondly, it is difficult to keep the bidders updated as to the current high bids on the various items. Electronic mail on most large public networks, such as the Internet, is lower priority traffic than most, meaning it can take several hours for bids to reach the auctioneer and for bidding updates to reach the bidders. Thirdly, as the auction closing draws near, the volume of bids may prohibit the auctioneer from sending out high bid information to the bidders because of the time involved in reading the electronic mail bids and in entering them into the bid database.

A recent innovation applied to E-mail auctions is the use of the Internet's World Wide Web (WWW) facility to post descriptions of the merchandise and show the current high bids. This innovation provides the advantage of eliminating the need to electronically mail bidding updates to bidders. And since WWW traffic is much higher priority on the Internet, bidders suffer less of a time lag in seeing updated Web pages. However, a human auctioneer is still involved and is required to manually process the electronic mail bids, enter them into the bid database, and to update the World Wide Web pages with current high bid information.

Sales firms other than auction houses have also used the Internet's World Wide Web facility to post descriptions of their merchandise and to offer the merchandise for sale at a set price. These systems are automated and are capable of accepting an order from a customer by having that customer fill out an online order form. This order information is taken by the system and placed into an order database or accounting system which then processes the order. However, such systems sell merchandise only at a fixed price and do not allow merchandise to be auctioned off, or to have their prices dynamically adjusted in an interactive manner in response to bids and other market conditions such as supply and demand.

Security brokerage firms for years have used automated transaction systems for matching buy and sell orders for securities. For example, the New York Stock Exchange's DOTS (Direct Order Transmission System) and the NASDAQ's SOES (Small Order Execution System) systems offer complete electronic matching of buyers and sellers. However, these systems do not operate an auction. They merely pair buy orders with sell orders when the pricing criteria of both sides of the trade are met.

A number of issued U.S. patents relate to various forms of electronic commerce. These patents fall into three broad categories: 1) patents relating to on-line networks, 2) patents relating to electronic commerce over on-line networks, and 3) patents related to various forms of securities (e.g., stocks and futures) trading via electronic means. From the first of these groups, on-line networks, U.S. Pat. No. 5,406,475 entitled Data Processing Network Having A Plurality Of Independent Subscribers, U.S. Pat. No. 5,235,680 entitled Apparatus And Method For Communicating Textual And Image Information Between A Host Computer And A Remote Display Terminal, and U.S. Pat. No. 5,310,997 entitled Automated Order And Delivery System, are representative of the prior art. These patents describe systems of terminals connected over wide area networks to centralized computers. However, they do not disclose the details of electronic commerce or auctions in particular.

In the second group, patents relating to electronic commerce, U.S. Pat. No. 5,285,383 entitled Method For Carrying Out Transactions Using Electronic Title, and U.S. Pat. No. 5,297,031 entitled Method And Apparatus For Order Management By Market Brokers, describe various means for conducting transactions over electronic communications networks. They also describe various means for displaying merchandise for sale to a plurality of customers connected to a central computer of a computer network and various means for conducting simple sale transactions where a buyer purchases an item at the stated price. As a group, these patents do not disclose the means for conducting electronic auctions or any sales format other than a simple or "straight" sale.

One particular U.S. Pat. No. 4,789,928, discloses a means for soliciting bids over an electronic network from bidders that are remote to the site of a live auction. This system records bids from remote bidders and simultaneously transmits the current high bid from the floor of the physical auction to the terminals of the remote bidders. However, this patent does not disclose or suggest the concept of an electronically conducted auction including a means for automatically closing the auction under certain conditions and without benefit of a live human auctioneer. Furthermore, this patent fails to disclose or suggest a means for auctioning a plurality of items simultaneously; rather, the disclosed system is strictly tied to the sequential proceedings of a physical auction. Finally, this system contemplates only a simple "highest bidder" auction where a single lot goes to an individual high bidder. This system cannot handle a lot available for auction which includes a plurality of items and where a plurality of winning bidders sufficient to match the plurality of auctioned items exists.

In the third group of patents related to electronic commerce, patents relating to securities trading, U.S. Pat. No. 4,412,287 entitled Automated Stock Exchange, and U.S. Pat. No. 5,077,665 entitled Distributed Matching System, disclose means for prospective buyers to post offers to buy a given security at a specific price and for prospective sellers to post offers to sell a given security at a specific price. These automated systems maintain lists of buy and sell orders. If an offer to buy a security is placed at a price greater than or equal to an existing offer to sell that security at a given price, these systems will automatically consummate the trade by matching the buyer with the seller. While the securities industry uses, and these patents disclose, such terms as "auction" and "bid", they are actually referring to the process of matching a set of buyers' bids with a set of sellers' prices. There is no auction in the true sense of a plurality of bidders simultaneously bidding in a manner accessible to all bidders and sellers in order to achieve a high selling price. In fact, these patented systems do not include disclosure of the list of open buy or sell orders, thus depriving the seller of the ability to openly solicit the highest price for securities. Instead, the market price of securities sold through these automated systems fluctuates up and down based upon the last successful match between an open buy order and an open sell order when both the buyer and seller have placed orders at compatible prices. There is no ability in such systems to conduct truly competitive and open bidding.

The present invention overcomes the above-listed drawbacks of the background art by providing a method and system for conducting auctions and mark down sales of merchandise over a computer network without the aid of a human auctioneer. The system is open to bidders anywhere in the world, leading to increased bid activity. Complete and thorough descriptions of all offered merchandise may be placed on-line, since the costs associated with printing auction catalogs are minimized in an electronic medium. An auction within the inventive system may be conducted over a period of time, mitigating the problems of inconvenient scheduling and time zone differences. A variety of auction formats can be employed within the inventive system depending on the type of merchandise being sold. And finally, the method and system of the present invention can be conducted automatically without the need for a human auctioneer, thereby allowing for a large number of items to be continuously auctioned.

SUMMARY OF THE INVENTION

To address the shortcomings of the background art, the present invention provides, in a computer network enabling communication between a host computer and a plurality of remote bidders, a system and method for transmitting and processing auction information implemented as a computer program within the host and network, comprising posting means for posting information across the network, the information being descriptive of a lot available for purchase, bidding means available to the bidders for submitting a plurality of bids across the network in response to the information, receiving means for receiving a plurality of bids sent across the network by the plurality of bidders, and categorizing means for automatically categorizing the bids as successful or unsuccessful.

The present invention further provides, in a computer network enabling communication between a host computer and a plurality of remote customers, an auction information transmission and processing system implemented as a computer program within the host and network, comprising, a merchandise database connected in communication with the host for storing merchandise information, the merchandise information being descriptive of a lot available for purchase by a customer, a bid database in communication with the host for storing bid information, the bid information being descriptive of a bid received from one of the remote customers, an auction manager implemented in the server and in communication with the databases, an electronic mail messenger in communication with the auction manager and the bid database, a bid validator, including means for receiving bids from the customers, connected to the auction manager and in communication with the bid database, wherein the auction manager induces a customer to bid across the network on a lot of merchandise by posting a descriptive merchandise catalog page containing data from the merchandise database, the customer views across the network the catalog page and sends a bid to the bid validator across the network, the bid validator determines whether the bid is valid, the bid database stores the bid, the auction manager determines whether the bid is successful, and the electronic mail messenger notifies the customer whether the customer's bid was determined to be successful by the bid manager.

A primary advantage of this system is that it results in greater prices for merchants as well as broader distribution of their products. By incorporating an auction format which is available to a wide audience via electronic means, the inventive system and method results in more bidders, greater demand, and hence higher prices for the seller. And because this electronic system reaches a geographically diverse audience, merchants' product lines becomes visible in areas where their products are not normally distributed or advertised, resulting in increased sales volume without increased marketing expense. As the network grows, business grows. Furthermore, the electronic auction system is automatic and does not require a human auctioneer, thereby allowing many individual items to be auctioned during the same time period and providing a decrease in costs associated with running an auction. Indeed, it would not be possible to operate an equivalent twenty-four hour per day, seven day per week auction with potentially hundreds or even thousands of individual items and millions of potential bidders without such an inventive electronic auction method and system.

BRIEF DESCRIPTION OF THE DRAWINGS

The aforementioned advantages of the invention, as well as additional advantages thereof, will be more fully understood as a result of a detailed description of a preferred embodiment when taken in conjunction with the accompanying drawings in which.

DETAILED DESCRIPTION OF A PREFERRED EMBODIMENT

An inventive method and system is disclosed for conducting a multi-bidder, interactive auction without using a human auctioneer to conduct the auction. Preferably implemented in software, the electronic auction system allows a group of bidders to interactively place bids over a computer or communications network, automatically records the bids, updates the bidders with the current auction status information, closes the auction from further bidding when appropriate, and notifies the winning bidder or bidders and loser or losers as to the auction outcome.

The inventive system includes a database for maintaining descriptions of the merchandise for auction, the bids, and other relevant information in a commercially available database system. Database searches are preferably performed periodically to check for new items to be made visible to potential bidders. Such periodic searching allows an individual charged with maintaining this system to load relevant information into the database at his or her leisure. Once the database is loaded with information about the item and the item is scheduled for presentation to potential bidders, the system takes the merchandise information and creates a human readable catalog page for a viewing over a public network such as the Internet's World Wide Web. Bidders are then able to view the new item for auction and to place their bids. These catalog pages preferably contain the current high bid, bid increment, quantity available, merchandise description, and picture of the item.

Upon accessing a public network and seeing an item's catalog page, the bidder may press a button on the catalog page or take some similar action which causes a bid form to be displayed on the screen. The bidder then enters the information necessary to place a bid, such as their name and address, bid amount, payment information, etc., and then presses a bid submission button, or takes a similar action which sends the bid to the system.

The system receives the electronic bid information and places it in the bid database. Because this new bid will, in general, be a bid for a higher amount than was last bid by another party, the system will regenerate the item's catalog page. This updated catalog page will then show the new high bid to any prospective bidders who later access that catalog page.

Because most bidders will not, in general, be accessing the network and viewing the merchandise catalog pages as they are updated with new high bids, the system may send electronic mail notifications to bidders who have been outbid by the just-placed bid. These electronic mail notification messages preferably contain the relevant merchandise information, the current high bid, the bid increment, etc., and encourage the bidder to submit a new and higher bid to outbid the current high bidder. These electronic mail notification messages allow the bidder to enter a new bid by replying to the electronic mail message and sending it back to the system.

Upon receiving a new or revised bid via electronic mail, the system follows the same set of actions as when the bidder places a bid using the electronic bid form when viewing a merchandise catalog page, namely, the system extracts the relevant bid information from the electronic mail message, deposits this information in the bid database, and then updates the merchandise catalog page as appropriate. Such an electronic mail message bid may further cause a new round of electronic mail notifications to go out to the recently outbid bidders.

This process preferably continues until the system detects that the item is scheduled to be closed for further bidding or another closing trigger is detected. At this point, the system closes the auction by updating the merchandise catalog page with the final winning bid information and by sending electronic mail notifications to both the winning bidder or bidders and the losing bidder or bidders.

The present invention provides an electronic auction method and system for presenting merchandise for sale at auction to customers over an electronic network, such as the Internet's World Wide Web. Potential customers are presented with a series of descriptive merchandise catalog pages through which they may navigate to find items (lots) of interest. Upon finding a lot of interest, customers may click a button on screen to display a form for placing a bid on the lot. After submitting this bid, the electronic auction system records the bid and updates the lot's merchandise catalog page to show the current high bid or bids and to whom such bids are attributable. When the auction is closed, after a period of no bidding activity, at a predetermined time, or when a desired sales volume is reached, the electronic auction system notifies the winning and losing bidders by electronic mail and posts a list of the winning bidders on the closed lot's merchandise catalog page.

Figure 1:
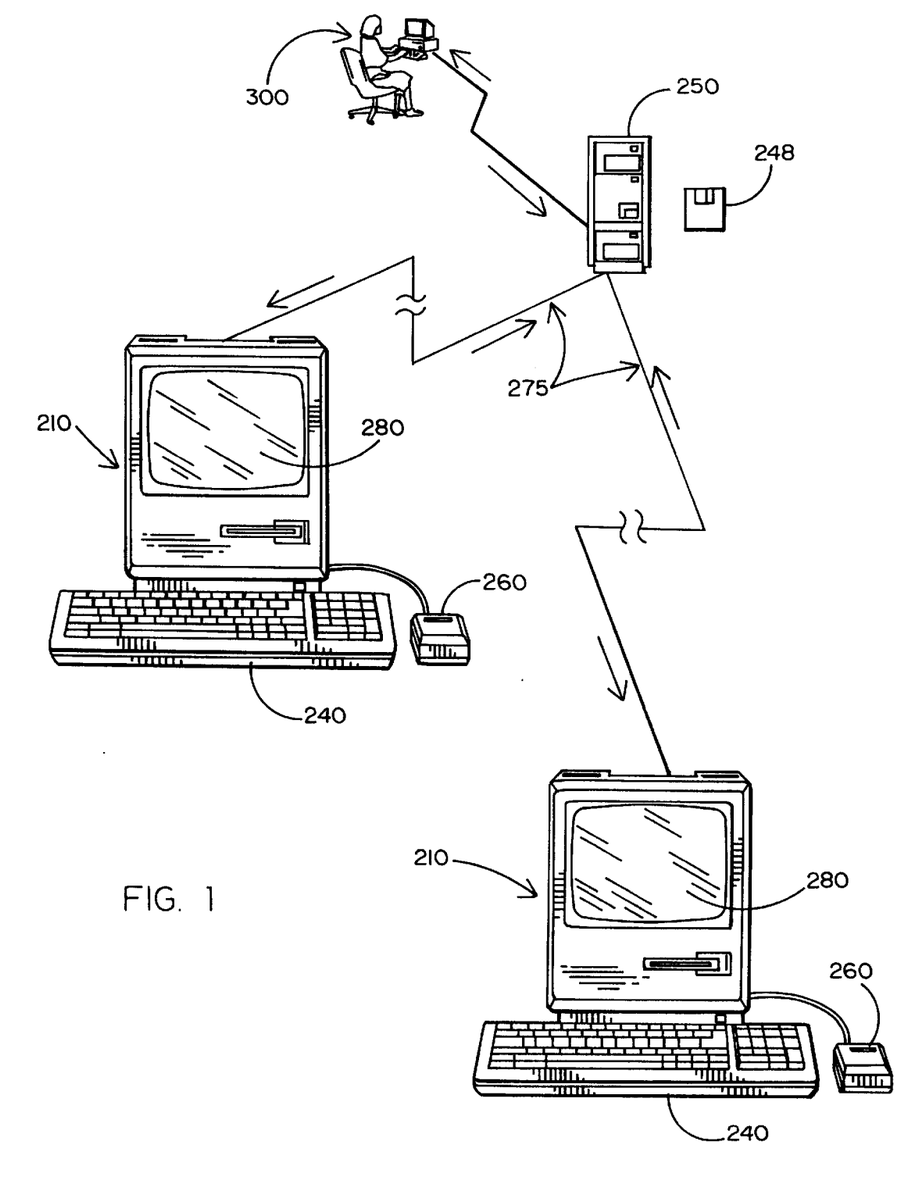
FIG. 1 illustrates a preferred computer environment for implementing the system and method of the present invention.

The present invention is preferably implemented as a computer program 248 running on a central server host computer 250, shown in FIG. 1, attached to a wide area network 275 accessible by many potential customers through remote terminals 210. A preferred network for implementing the present invention is the Internet which is accessible by a significant percentage of the world population, although the network may also be a local area or limited area accessible network. Potential customers are presented at screen 280 with merchandise catalog pages, such as the one shown in FIG. 2, generated by merchandise catalog page generator 25 shown in FIG. 4. Each merchandise catalog page includes several action buttons 5 that allow the customer to move from catalog page to catalog page and to place bids using keyboard 240 and pointing device 260. The user may call up an index of available merchandise by pressing button 7 or may return to a central home page by pressing button 9.

Figure 2:
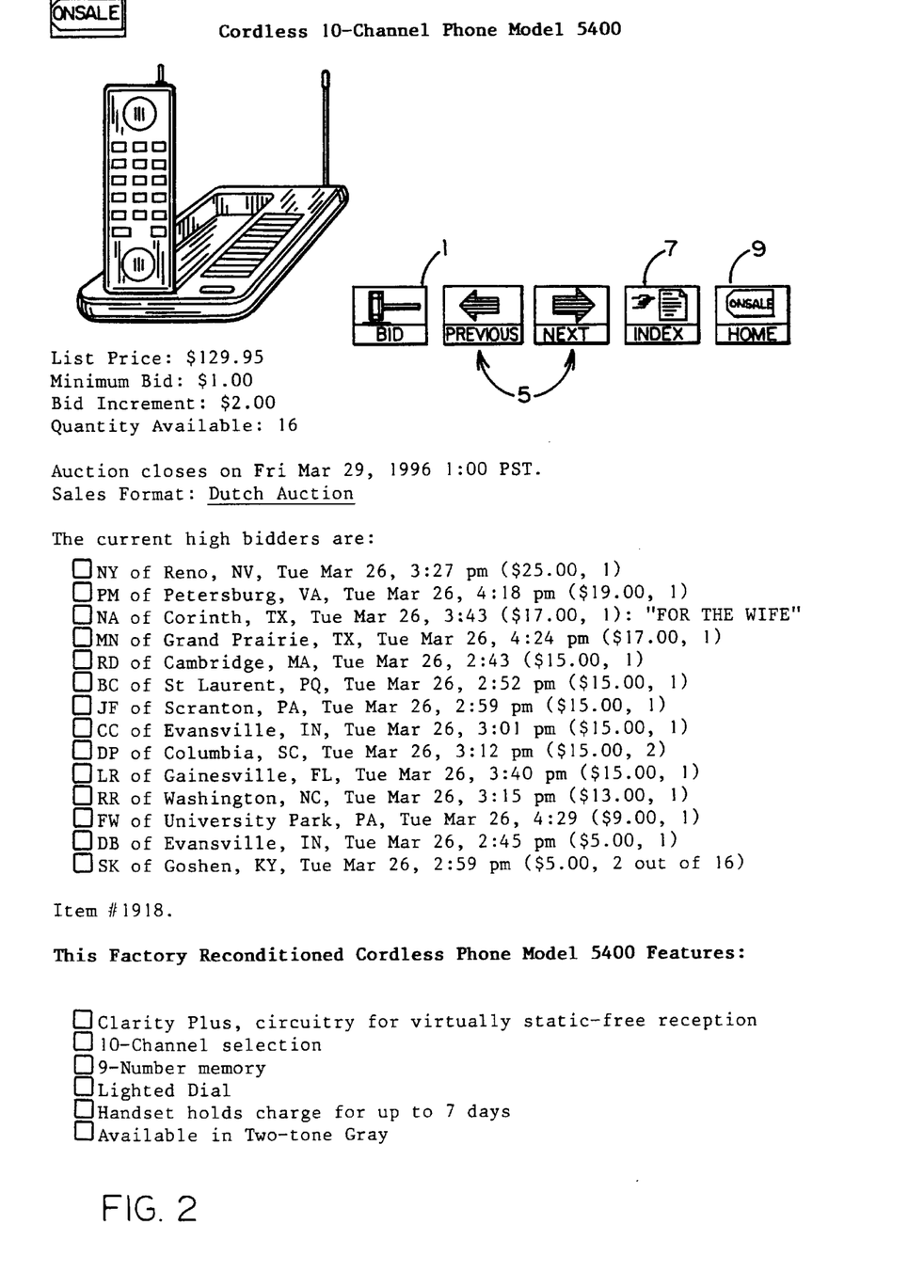
FIG. 2 illustrates a merchandise catalog page offering an item for sale via electronic auction on the Internet's World Wide Web.
Figure 3:
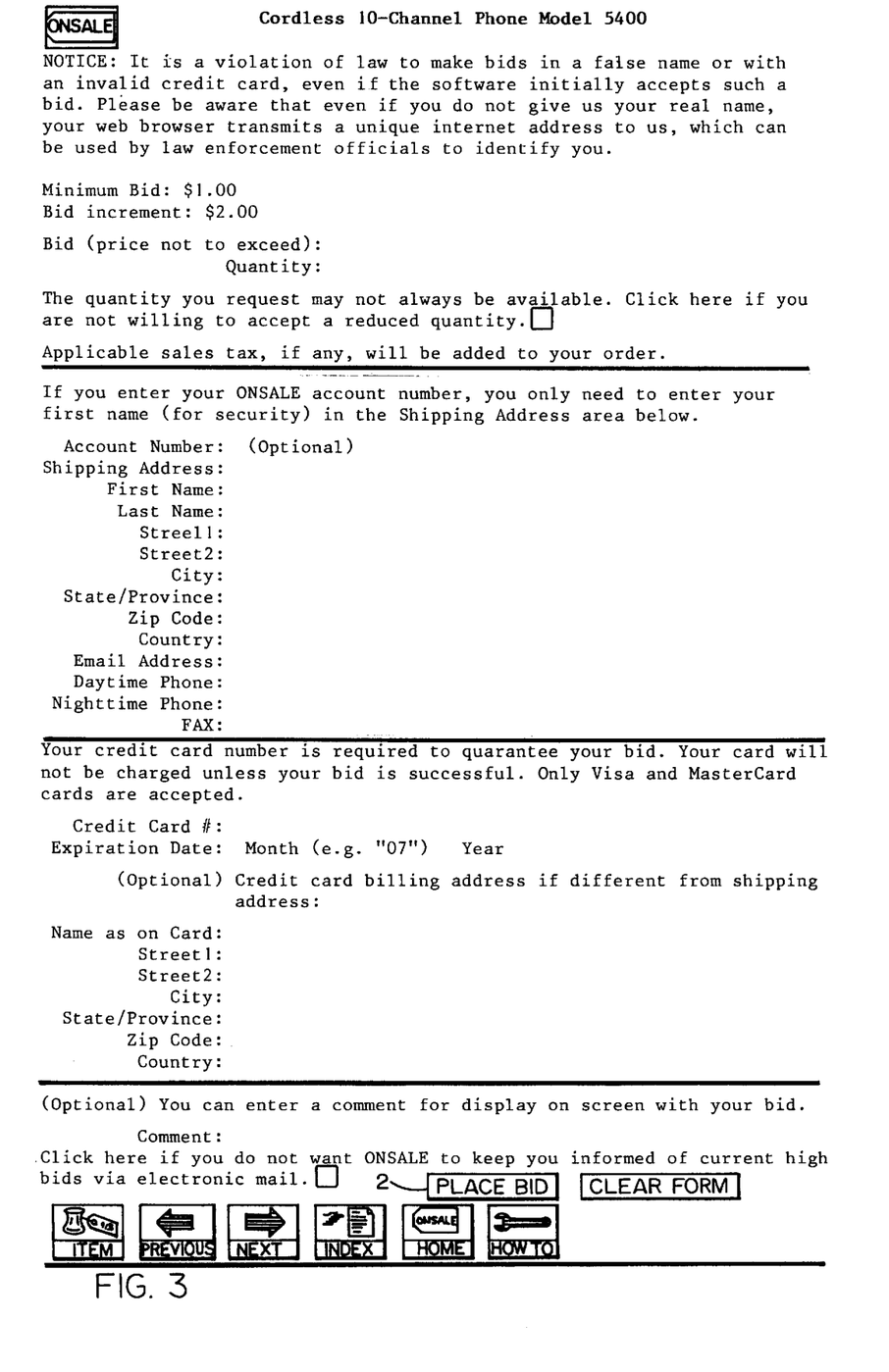
FIG. 3 depicts a bid form for bidding on an auction item.

By pressing bid button 1 in FIG. 2, the customer is presented with a bid form such as the one shown in FIG. 3. The customer fills out the required information in the bid form and presses "Place Bid" button 2 to send the bid to the electronic auction system for processing. Other equivalent means for submitting a bid could be used, as understood by those skilled in the art to which the present invention pertains.

Figure 4:
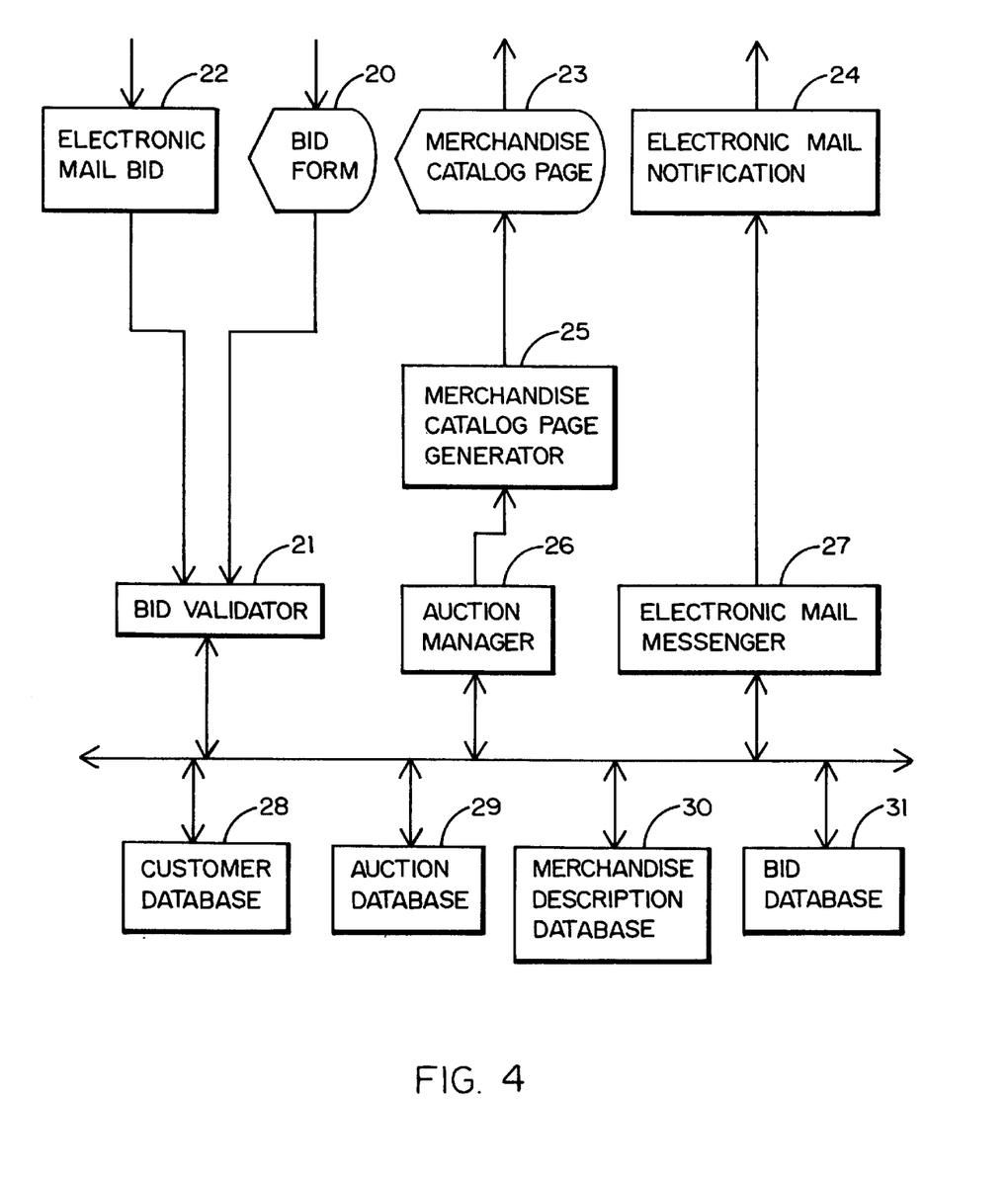
FIG. 4 is a block diagram of components illustrating a preferred embodiment of the present invention.

FIG. 4 illustrates a high level block diagram of the electronic auction system of the present invention. As shown, information from bid form 20 is received by the electronic auction system where it is processed by bid validator 21. Bid validator 21 examines the bid information entered by the customer on bid form 20 to ensure that the bid is properly formatted, all necessary data is present, and the data values entered look credible. Exemplary functions of bid validator 21 include verifying credit card information entered by the customer, checking that a complete name and shipping address has been entered, that the proper state abbreviation and zip code have been entered, that an appropriate bid amount has been entered, and that a telephone or facsimile number has been entered. Once the bid information has been validated, the bid validator 21 places the bid in bid database 31.

Auction manager 26 preferably frequently queries the bid database 31 to see if any new bids have been placed. If new bids are found during the query, then auction manager 26 calculates the current high bidder or bidders and instructs merchandise catalog page generator 25 to regenerate a catalog page with the updated bid information.

Auction manager 26 is also responsible for opening and closing auctions. This entails making merchandise lots available for bidding by customers and disabling their associated buy or bid features on the merchandise pages that have been posted to potential bidders but have closed. When auction manager 26 determines that a new lot should be opened for bidding or an available lot should be closed, it instructs merchandise catalog page generator 25 to create or update the merchandise catalog pages for the appropriate lots.

Electronic mail messenger 27 frequently queries bid database 31 for bids recently marked by auction manager 26 as having been outbid or as having won an item in a recently closed auction. If such bids are found, the electronic mail messenger 27 formats an appropriate electronic mail notification message 24 and sends this message to the customer. Many customers read their electronic mail throughout the day, making this a convenient mechanism for keeping them informed about the status of merchandise on which they are actively bidding. Bidders may reply to an electronic mail notification message 24 informing them that they have been outbid by including an increased bid amount in the reply message. An electronic mail bid 22 sent in reply to the notification is received by the electronic auction system and processed by bid validator 21 as described above.

Figure 5:
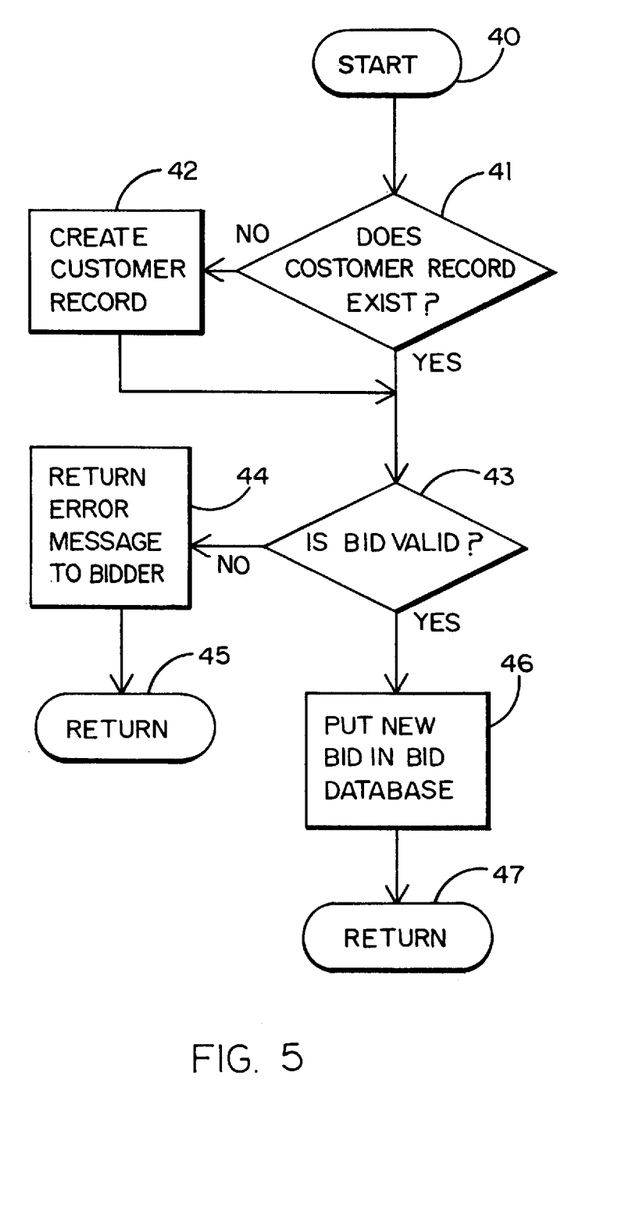
FIG. 5 is a flowchart illustrating the bid validator and its method of operation.

FIG. 5 illustrates in detail the procedure of bid validation as accomplished by bid validator 21 shown in FIG. 4. A bid is received by bid validator 21 and the customer is looked up at step 41 in customer database 28. If no customer record exists for the customer then a new customer record is created 42 and placed in customer database 28. From there, the bid information is validated 43 as previously described. If the bid data includes one or more errors, then an error message is returned 44 to the bidder, preferably in the form of a well-formatted page posted across the network, itemizing the errors found in the bid. If the bid is valid, as found in step 43, then the bid is placed 46 in bid database 31.

Figure 6:
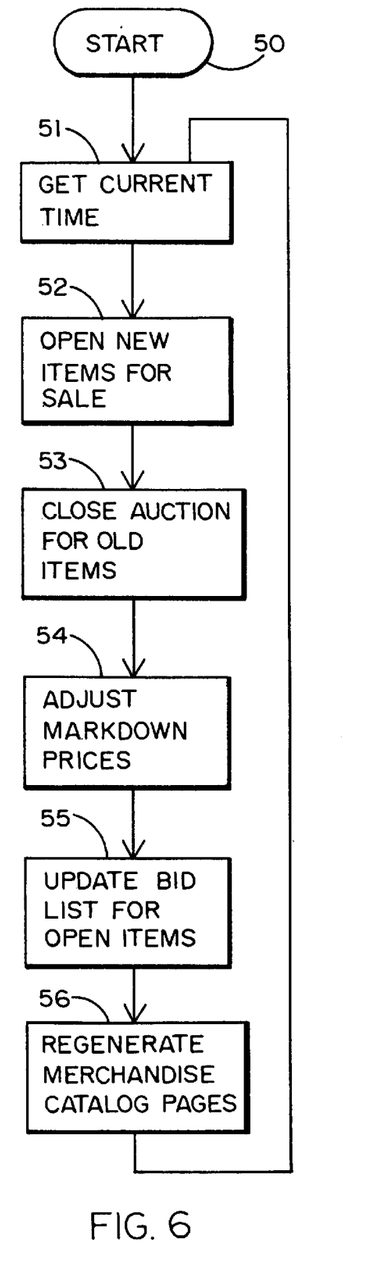
FIG. 6 is a flowchart illustrating the auction manager and its method of operation.

FIG. 6 provides a detailed illustration of the procedures carried out by auction manager 26. Auction manager 26 is preferably a continuously running system that begins by getting the current time as at step 51. It then checks to see if any new items for sale are to be opened by examining the merchandise database to see if any new merchandise items are scheduled to be made available for bidding by customers at or before the current time. Operator 300, or some automated substitute, may upload merchandise and scheduling information to the database, as shown in FIG. 1. If new merchandise items are scheduled for posting, these items are opened for bidding 52. The auction manager then examines the merchandise database to see if any merchandise items are scheduled to be closed from customer bidding. If so, these items are closed from bidding 53. Auction manager 26 then examines the merchandise database to see if any merchandise items posted with a price markdown feature are scheduled to have their prices adjusted. If so, the prices of these items are adjusted 54 in accordance with the particular item's price adjustment parameters. Such parameters may include bidding activity over time, amount of bids received, and number of items bid for. Auction manager 26 then updates 55 the bid list for open items by recalculating the current high bidder list and regenerating the merchandise catalog pages 56 to reflect these new bids. This step is more fully described below with reference to FIG. 7.

Figure 7:
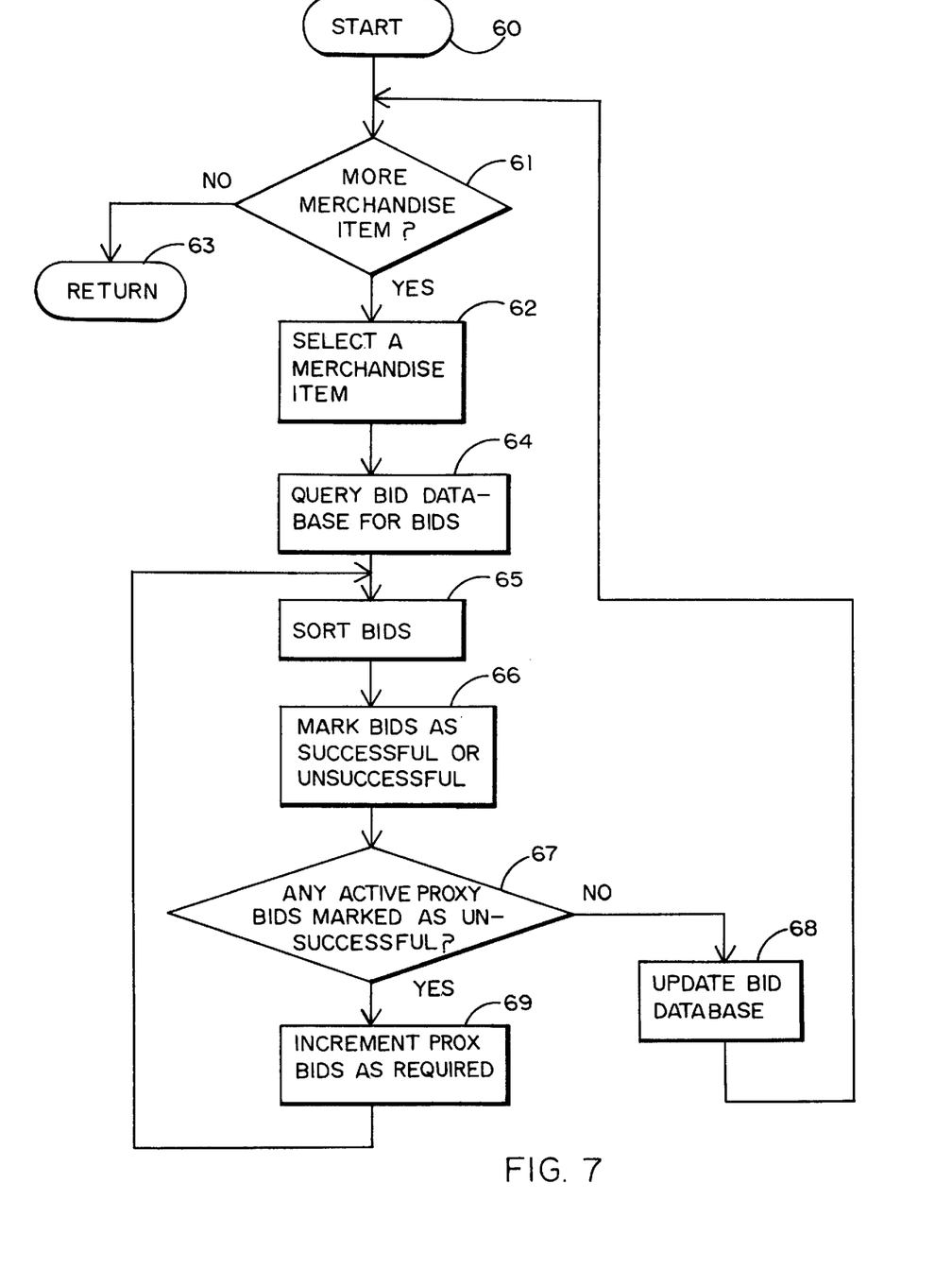
FIG. 7 is a flowchart illustrating the bid manager and its method of operation.

FIG. 7 illustrates the procedures carried out by the bid manager in updating the bid list for open items 55 as shown in FIG. 6. The bid manager begins by checking 61 if there are more merchandise items to be processed. If such items are found, the bid manager selects 62 a merchandise item to process and queries 64 the bid database for bids for this item. These bids are sorted 65 using a variety of different priority ranking schemes depending upon the auction method and system used for the particular merchandise item, as described in more detail below. Then, the bids are marked 66 as either successful or unsuccessful depending upon the bid price of the respective bids and the quantity of the item being bid on relative to the quantity of the item being auctioned. In a preferred embodiment, a quantity of an item may be put up for auction, and individual bidders may bid on any quantity of the item desired, up to the quantity of the item being auctioned.

The bid manager then checks 67 to see if there are any active proxy bids marked as unsuccessful. A proxy bid is a special bid type that allows auction manager 26 to automatically bid on the bidder's behalf up to a limited amount established by the bidder when his or her initial bid is placed. The auction manager will increase the bid as necessary up to the limit amount. This feature allows the customer to get the lowest possible price without exceeding a limit preferably established when the bid is entered. If there are active proxy bids marked as unsuccessful, then the bid manager increments 69 the proxy bids by a preset bid increment. This procedure of sorting 65 marking 66 bids and incrementing 69 the proxy bids as required continues until either there are no additional proxy bids marked as unsuccessful or the proxy limits have been reached on the proxy bids. At this point, bid database 31 is updated 68 with the marked bids. This process is then repeated for each merchandise lot open at the current time for bidding by customers.

Figure 8:
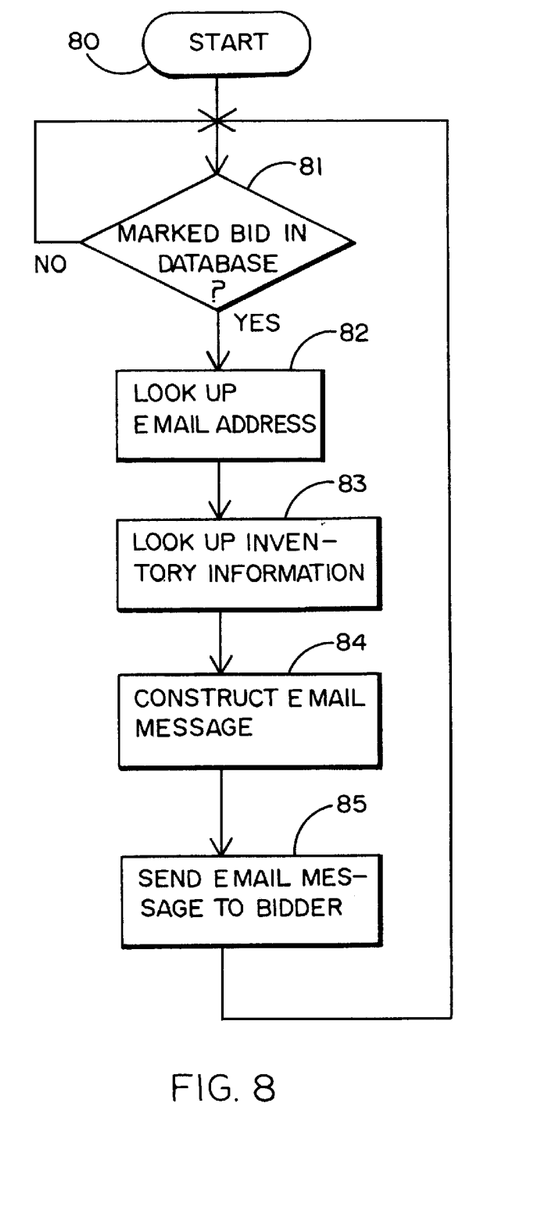
FIG. 8 is a flowchart illustrating the electronic mail messenger and its method of operation.

FIG. 8 illustrates the procedures carried out by electronic mail messenger 27 which notifies bidders when they have been outbid. When marked bids are updated in bid database 31 as shown in FIG. 7, electronic mail messenger 27 detects 81 the presence of these marked bids and then looks up 82 the customer's electronic mail address and looks up 83 inventory information on the item desired by the bidder. With this information, electronic mail messenger 27 constructs 84 an electronic mail message informing the bidder that he or she has been outbid. Once constructed, the electronic mail notification message 24 is sent to the bidder as shown at step 85.

One skilled in the art to which the present invention pertains will recognize that the various components of the electronic auction system can communicate between themselves in a variety of ways. In a preferred embodiment, bid validator 21, auction manager 26, and electronic mail messenger 27 communicate by adding, marking, and updating records in the various databases. Each of these components periodically checks at least one of the databases to see if anything relevant to their respective functions has changed and take action accordingly. However, the components could send direct messages between themselves or call each other by means of program subroutines to signal important events that would require one or the other component to update its state.

One skilled in the art to which the present invention pertains will further recognize that a variety of different auction formats may be implemented using the basic technique described above. The simplest is the "Standard Auction" format, whereby the electronic auction system awards the merchandise to the top bidder or bidders in accordance with their bids once bidding has stopped. Using this format, if there is a plurality of a specific item, the system awards the merchandise to the top bidders. Bidders may bid on more than one unit, and different successful bidders will, in general, pay different prices for an item.

Figure 9:
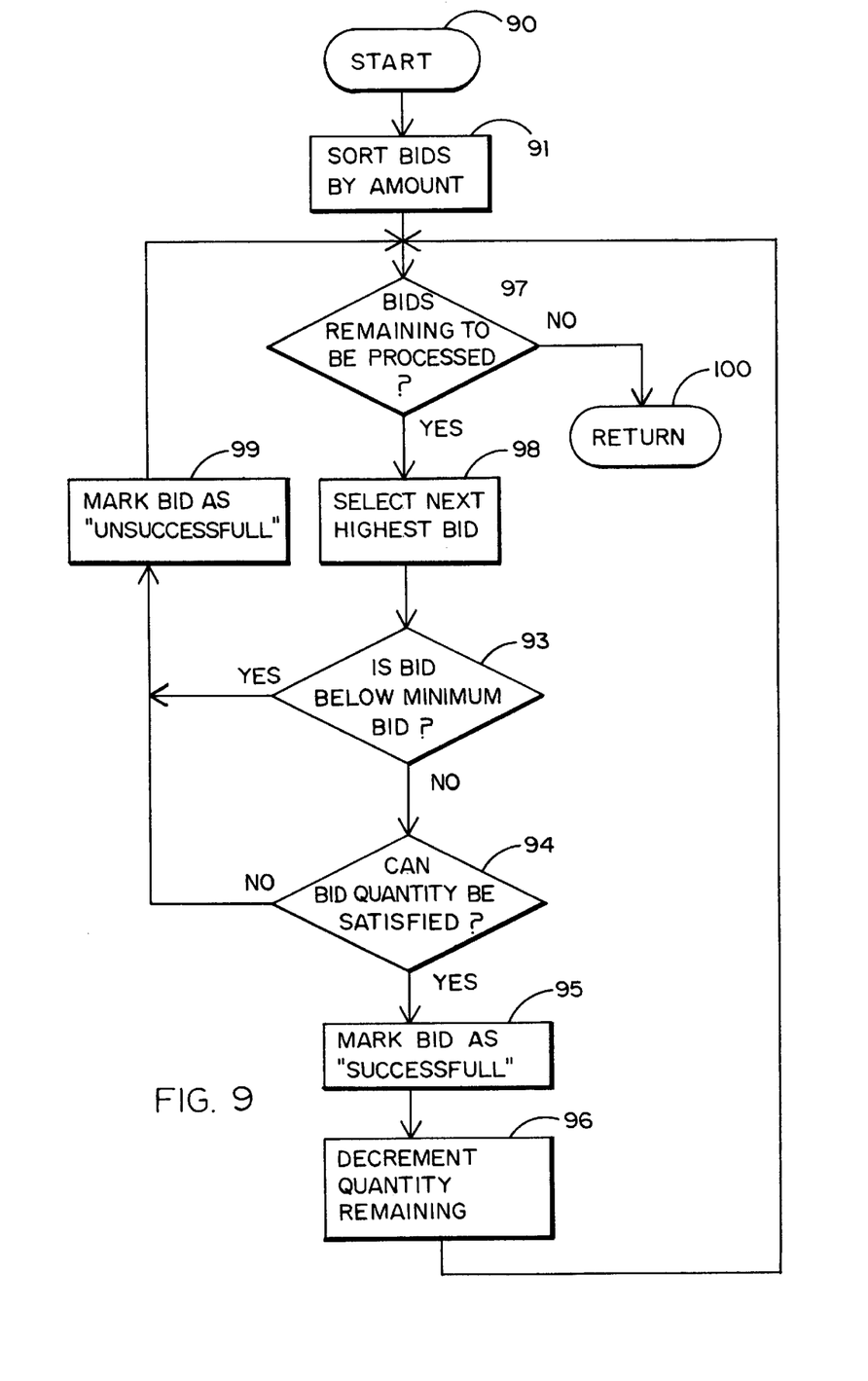
FIG. 9 is a flowchart illustrating the standard auction format and its method of operation.

FIG. 9 illustrates the Standard Auction format where bid manager 55, shown in FIG. 6, determines which bids to mark as successful or unsuccessful, as shown in step 66 in FIG. 7. Bid manager 55 begins by sorting 91 the bids by amount of the bid. If there are bids remaining to be processed, determined at step 97, the highest remaining bid is selected 98 to be checked. If the bid is below the minimum bid allowed for the particular merchandise item, as determined at step 93, the bid is marked 99 as unsuccessful. If not, the bid is checked 94 to see if the quantity may be satisfied. A bid may be satisfied if the quantity of the item bid upon is available. This information is available from auction database 29. If not, then the bid is marked 99 as unsuccessful. Optionally, the system could ask the user if a lesser quantity than bid upon will be acceptable, as shown in FIG. 2 at box 310. If the bid quantity can be satisfied, as determined at step 94, then the bid is marked 95 as successful and the item quantity remaining, recorded in auction database 29, is decremented 96 by the bid quantity. After the quantity remaining is decremented 96, and if, as determined at step 97, there are still bids remaining to be marked, the next highest bid is selected 98 and the steps of FIG. 9 are repeated.

The electronic auction system of the present invention also provides a "Dutch Auction" format, wherein the electronic auction system awards the merchandise to all of the top bidders for whom there is available inventory at the price bid by the lowest successful bidder. This format may be preferred by customers for being the most fair when a plurality of a specific item is being auctioned. As with all bidding, there will be a range of bids submitted. In the Dutch Auction format, the highest bidders are awarded the merchandise but at the same price for all successful bidders, the price bid by the lowest successful bidder.

Figure 10:
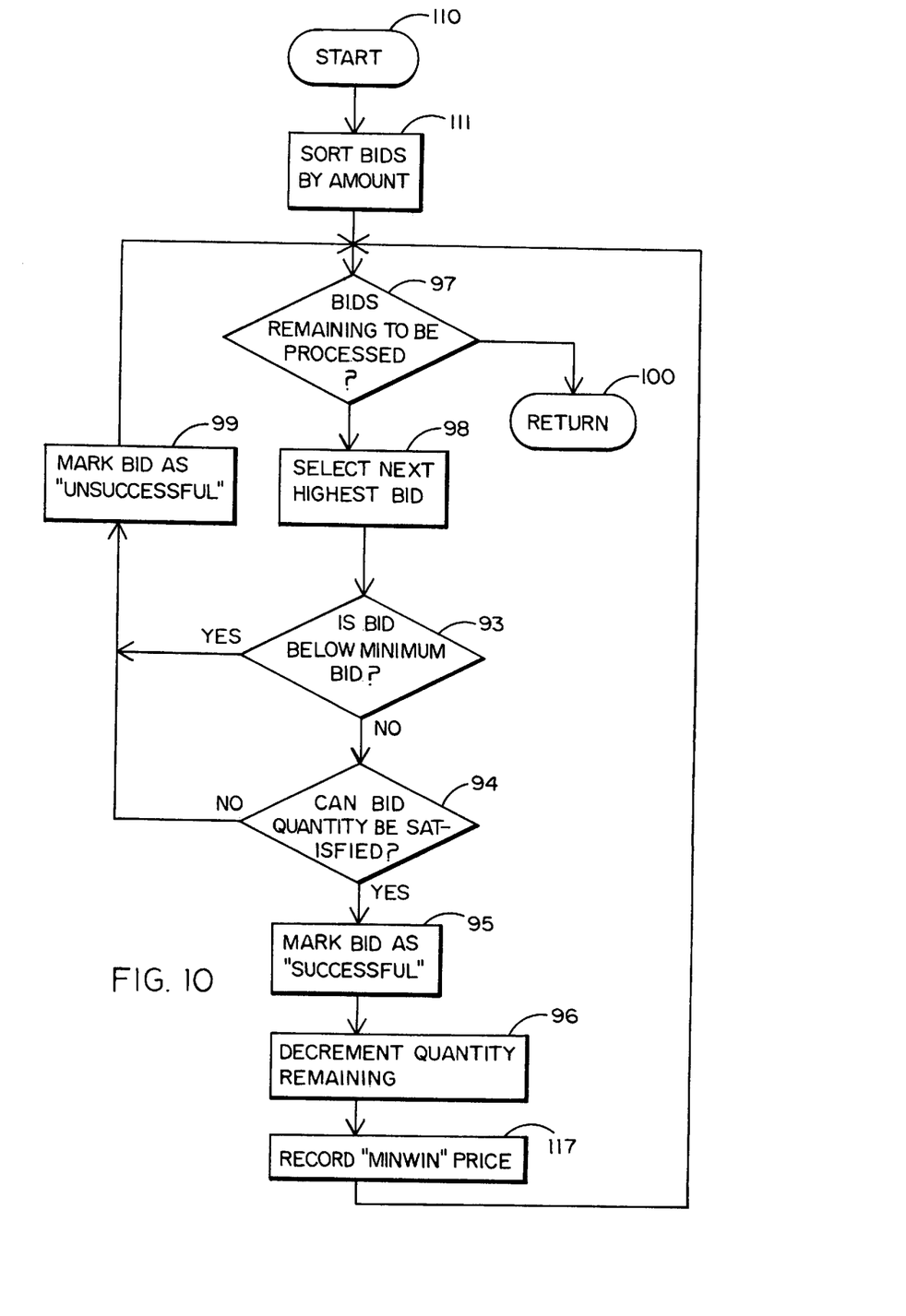
FIG. 10 is a flowchart illustrating the Dutch auction format and its method of operation.

FIG. 10 illustrates the Dutch Auction format whereby bid manager 55 shown in FIG. 6 determines which bids to mark 66 as successful or unsuccessful, as shown in FIG. 7. Bid manager 55 begins by sorting 111 the bids by amount of the bid. If there are bids remaining to be processed, as determined at step 97 the highest bid is selected 98 to be checked. If the bid is below the minimum bid allowed for the particular merchandise item, as determined at step 93, the bid is marked as unsuccessful 99. If not, the bid is checked 94 to see if the bid quantity may be satisfied. If the bid cannot be satisfied, then the bid is marked as unsuccessful at step 99. If the bid quantity can be satisfied, then the bid is marked as successful at step 95 and the item quantity remaining is decremented 96 by the bid quantity. At this time the MinWin price is recorded 117. The MinWin price is the price above which a new bidder must bid in order to be successful in the Dutch Auction format were the auction to close at that moment. The MinWin price is, in general, the bid price of the lowest bid that is marked as successful. After recording the MinWin price at step 117, where there are still bids remaining to be marked, as determined at step 97, the next highest bid is selected 98 and the steps of FIG. 10 are repeated.

The electronic auction system of the present invention also includes a "Progressive Auction" format, wherein the electronic auction system awards the merchandise to the top bidders based on price bid. As with the Dutch Auction format, the highest price bids are awarded the merchandise up to the quantity available of the item being auctioned. However, unlike the Dutch Auction format, the system awards the merchandise to the successful bidders at different prices depending on the quantity bid. In a preferred embodiment, a successful bidder for a single unit of an item is awarded the item at the price of the lowest successful bid for a single unit of the item. A successful bidder for a higher quantity of the same item is awarded the item at the price of the lowest successful bid at that quantity or any lower quantity. For example, a successful bidder for a quantity of five would pay the lowest price for any successful bid for quantity one through five of the item. The price paid for a given quantity is termed the "MinWin" price for that quantity. The Progressive Auction format ensures that successful bidders for a quantity of an item pay the lowest price paid by any other successful bidder at that quantity level or below. Use of this format leads to lower prices for those who successfully bid on larger quantities of an item, provides an impetus for volume buying, and therefore leads to greater sales volume.

Figure 11:
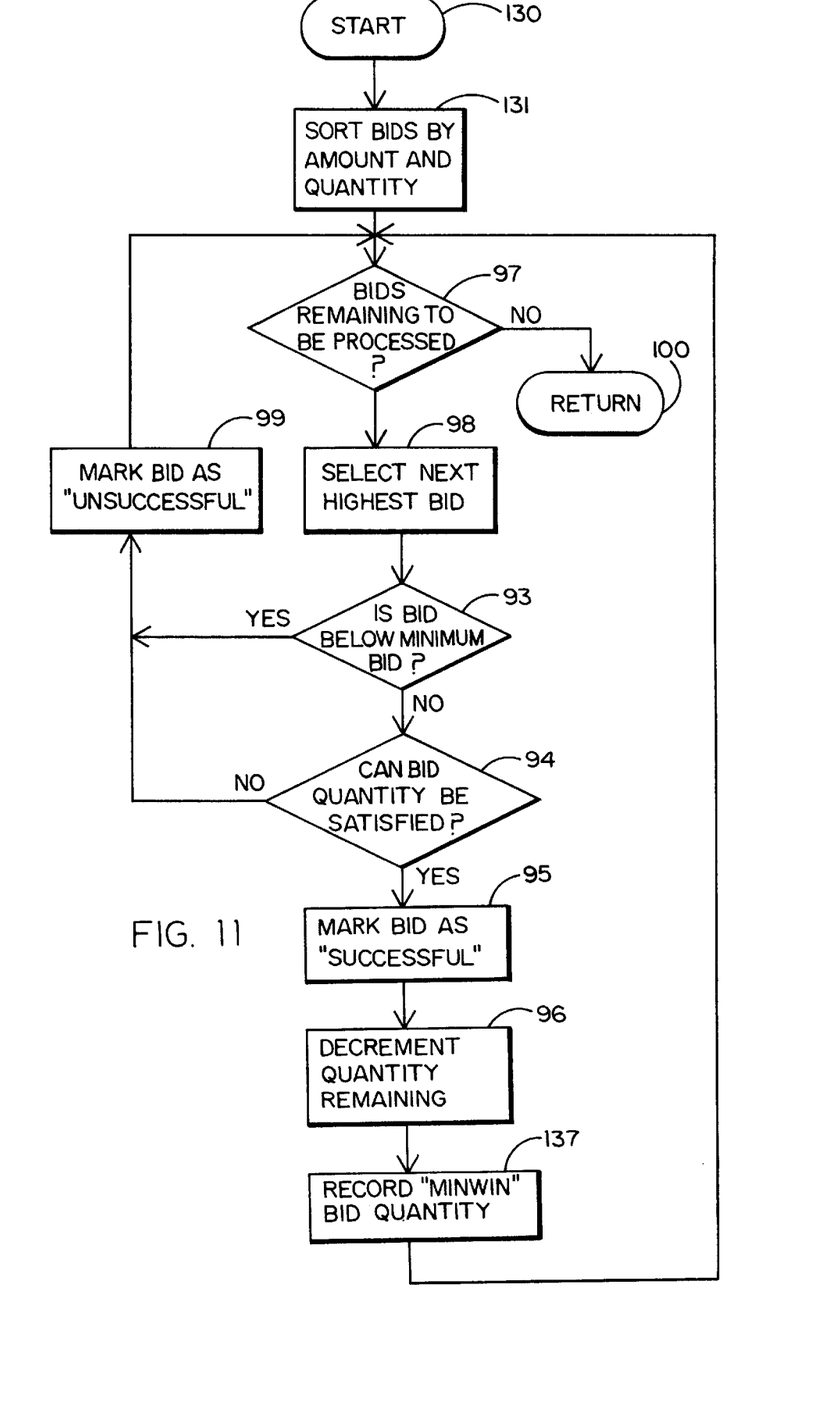
FIG. 11 is a flowchart illustrating the progressive auction format and its method of operation.

FIG. 11 illustrates the Progressive Auction format, wherein bid manager 55 shown in FIG. 6 determines which bids to mark as successful or unsuccessful 66 as shown in FIG. 7. Bid manager 55 begins by sorting 131 the bids by amount of the bid. If there are bids remaining to be processed, as determined at step 97, the highest bid is selected 98 to be checked. If the bid is determined to be below the minimum bid allowed for the particular merchandise item at step 93, the bid is marked as unsuccessful 99. If not, the bid is checked at step 94 to see if the bid quantity can be satisfied. If not, then the bid is marked 99 as unsuccessful. If the bid quantity is checked and found to be satisfied at step 94, then the bid is marked as successful 95 and the item quantity remaining is decremented 96 by the bid quantity. The MinWin price is then recorded 137. The MinWin price is the price above which a new bidder must bid in order to be successful in the Progressive Auction format were the auction to close at that moment. The MinWin price is, in general, the bid price of the lowest bid at the current bid quantity or lower that is marked as successful. After recording the MinWin price 137, if there are still bids remaining to be marked, the next highest bid is selected 98 and the steps of FIG. 11 are repeated.

The electronic auction system also includes a "Buy Or Bid" format wherein the electronic auction system awards merchandise to bidders who place bids at or above a posted selling price. The item remains for sale until the available quantity is purchased. Bids that are below the posted selling price are maintained in reserve by the system. If a certain sales volume is not achieved in a specified period of time, the electronic auction system automatically reduces the price by a predetermined amount or a predetermined percentage of the price and updates the merchandise catalog page accordingly. The lower price may be at or below some of the bids already in the bid database. If such bids are present, they are then converted to orders and the quantity available is reduced accordingly. Similarly, if a certain sales volume is exceeded in a specified period of time, the electronic auction system automatically increases the price by a set amount or by a set percentage of the price and updates the merchandise page accordingly. These automatic price changes allow the seller to respond quickly to market conditions while keeping the price of the merchandise as high as possible to the sellers benefit.

Figure 12:
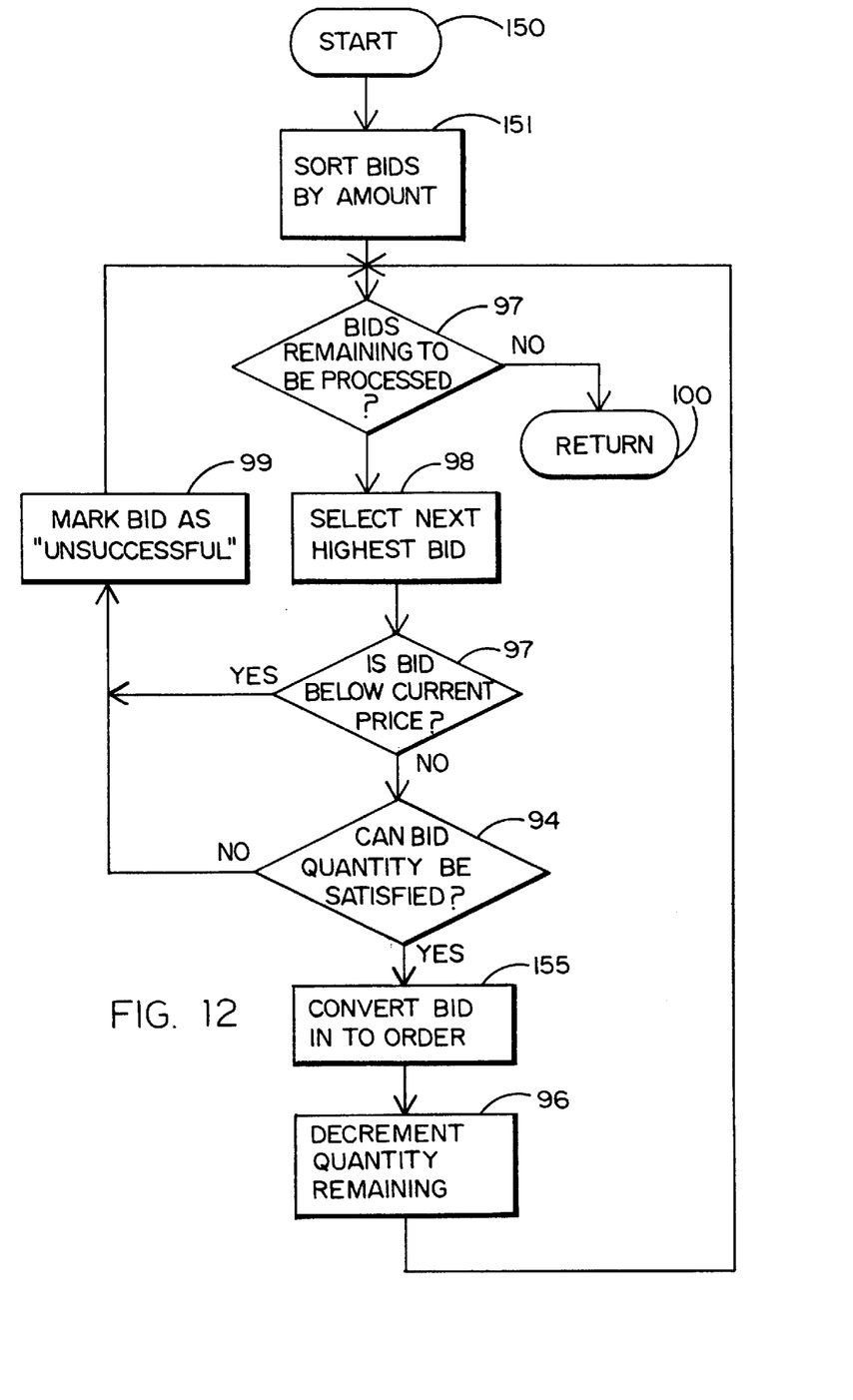
FIG. 12 is a flowchart illustrating the buy or bid sale format and its method of operation.

FIG. 12 illustrates the Buy Or Bid format whereby bid manager 55, as shown in FIG. 6, determines which bids to mark as successful or unsuccessful 66, as shown in FIG. 7.

Bid manager 55 begins by sorting 151 the bids by amount. If there are bids remaining to be processed, as determined at step 97, the highest bid is selected 98 to be checked. If the bid is below the current price of the merchandise item, as determined at 93, then the bid is marked 99 unsuccessful. If the bid is not below the current price, as determined at 93, then the bid is checked 94 to see if the bid quantity can be satisfied. If not, the bid is marked as unsuccessful 99. If the bid quantity can be satisfied, then the bid is converted into an order 155 at the current price of the item and the item's quantity remaining is decremented 96. The bids remaining to be processed, as determined at 97, are then checked and the steps of FIG. 11 are repeated. From time to time, the current price of the merchandise item may be raised or lowered either by manual input from an operator 300 as shown in FIG. 1 or by automatically using the "markdown" feature described below with reference to FIG. 14.

Figures 13, 14:
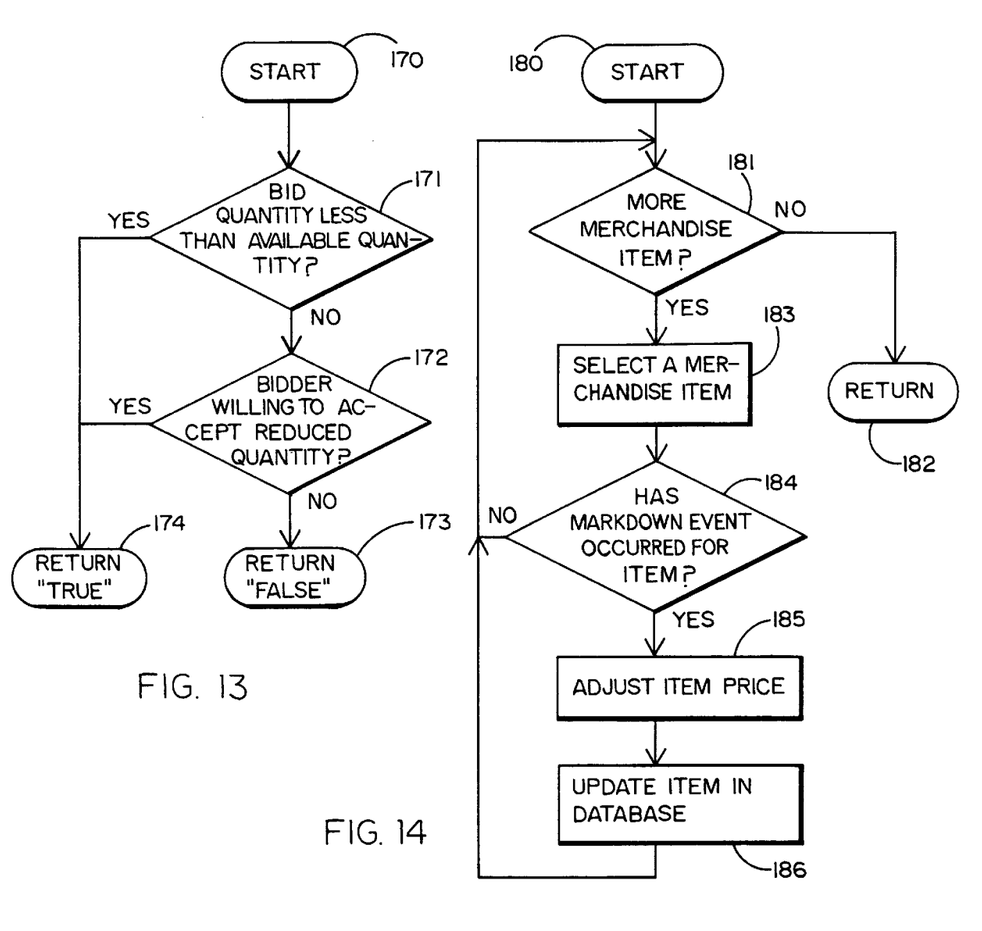
FIG. 13 is a flowchart illustrating bid quantity determination and its method of operation.
FIG. 14 is a flowchart illustrating the markdown price adjustment feature of the present invention and its method of operation.

FIG. 13 illustrates in more detail the step of determining if the bid quantity can be satisfied 94. If the bid quantity is determined to be less than the available quantity of the merchandise item at step 171, then the test is found satisfied at step 174. If not, then the bid is checked at 172 to see if the bidder is willing to accept a reduced quantity. Preferably, when placing a bid, the bidder indicates its willingness to accept a partial quantity in the event that an insufficient quantity of the item is available to satisfy the bid if successful. If the bidder is found willing to accept a reduced quantity at 172, then the test is found satisfied at 174. If not, the test fails at 173 and the bid is marked as unsuccessful at, for example, 99 in FIG. 9.

The electronic auction system also includes a "markdown" feature, wherein the electronic auction system of the present invention awards merchandise to buyers who place orders at the currently posted selling price. The item remains on sale until the available quantity is purchased. If a certain sales volume is not achieved in a specified period of time, the electronic auction system automatically reduces the price by a set amount or a set percentage and updates the merchandise catalog page accordingly. This lower price encourages buyers to take advantage of the new price. If a certain sales volume is exceeded in a specified period of time, the electronic auction system automatically increases the price by a set amount or a set percentage and updates the merchandise page accordingly. These automatic price changes allow the system to respond to market conditions while keeping the prices of the merchandise as high as possible to the seller's benefit.

FIG. 14 illustrates the Markdown price adjustment feature whereby auction manager 26, as shown in FIG. 4, periodically adjusts 54 the sales prices or minimum bid prices, of the merchandise items according to a predetermined schedule as shown in FIG. 6. If more merchandise items are found in the merchandise database at 181, a merchandise item is selected 183 for Markdown. If a Markdown event has occurred for the item, as determined at 184, the item's price is adjusted 185 according to the schedule preset for the individual item. Alternatively, the adjustment could be relative to prices offered for the merchandise. The merchandise item is then updated 186 in the database with the new sale price or minimum bid price. The steps of FIG. 14 are then repeated for each successive merchandise item in the merchandise database.

The electronic auction system of the present invention preferably includes a "Proxy Bidding" feature that may be applied to any of the auction formats described above. FIG. 7 fully describes auction manager 26 including the Proxy Bidding feature. When Proxy Bidding is employed, a bidder places a bid for the maximum amount they are willing to pay. The electronic auction system, however, only displays the amount necessary to win the item up to the amount of the currently high proxy bids of other bidders. Typically, the currently high bids display an amount that is one bidding increment above the second highest bid or bids, although a percentage above the second highest bids may be used as well. When a new bidder places a bid that is above a currently displayed high bid, the proxy feature will, in general, cause the currently high bid to move up to an amount higher than the new bid, up to the maximum amount of the currently high bidder's proxy bid. Once a new bidder places a bid in excess of the currently high bidder's proxy bid, the new bid becomes the current high bid and the previous high bid becomes the second highest bid. This feature allows bidders to participate in the electronic auction without revealing to the other bidders the extent to which they are willing to increase their bids, while maintaining control of their maximum bid without closely monitoring the bidding. Participation is engaged in automatically on the bidder's behalf by the inventive system. The feature guarantees proxy bidders the lowest possible price up to a specified maximum without requiring frequent inquiries as to the state of the bidding.

One skilled in the art to which the present invention pertains will recognize that a variety of different auction formats may be implemented in addition to those described above. One skilled in the art will also recognize that the electronic auction system of the present invention can employ a "Floating Closing Time" feature whereby the auction for a particular item is automatically closed if no new bids are received within a predetermined time interval. This feature would typically be implemented in a manner similar to that used to close auctions of old items, as shown at step 53 in FIG. 6. This feature forces the bidding activity to occur within a shorter amount of time than would otherwise be achieved because bidders are aware that the item will automatically close if no new bids have been received in a timely manner. Thus, bidders have an incentive to stay active in the bidding process to avoid closure of an item before maximum, and most potentially winning, bids have been entered. The Floating Closing Time feature also allows more items to be auctioned during a period of time since each item is closed once bidding activity ceases; the bidding period is not protracted to an artificial length as is the case when an item closes at a preset date and time. The Floating Closing Time feature of the present invention may be employed either in conjunction with or independent of a fixed closing time for an item. When employed in conjunction with a fixed closing time, the auction is closed either when the preset fixed time period has expired for the item or when no bidding activity has occurred within a preset time interval. This forces the bidding to cease at a particular time in case the bidding activity becomes artificially protracted.

A general description of the present invention as well as a preferred embodiment of the present invention has been set forth above. Those skilled in the art to which the present invention pertains will recognize and be able to practice additional variations in the methods and system described which fall within the teachings of this invention. For example, although a preferred embodiment of the present invention chooses winning bids according to monetary amount included in the bid, preference for bids may also be determined according to time of submission, quantity of merchandise bid for, total bid value, or some other combination of these characteristics. Accordingly, all such modifications and additions are deemed to be within the scope of the invention which is to be limited only by the claims appended hereto.

What is claimed is:

1. In a computer network enabling communication between a host computer and a plurality of remote customers, an auction information transmission and processing system implemented as a computer program within said host and network, said system comprising:

a merchandise database connected in communication with said host for storing merchandise information, said merchandise information being descriptive of a lot available for purchase by a customer;

a bid database in communication with said host for storing bid information, said bid information being descriptive of a bid received from one of said remote customers;

an auction manager implemented in said server and in communication with said databases;

an electronic mail messenger in communication with said auction manager and said bid database;

a bid validator, including means for receiving bids from said customers, connected to said auction manager and in communication with said bid database;

wherein said auction manager induces a customer to bid across said network on a lot of merchandise by posting a descriptive merchandise catalog page containing data from said merchandise database, said customer views across said network said catalog page and sends a bid to said bid validator across said network, said bid validator determines whether said bid is valid, said bid database stores said bid, said auction manager determines whether said bid is successful, and said electronic mail messenger notifies said customer whether said customer's bid was determined to be successful by said auction manager.

2. The system of claim 1 wherein said auction manager includes:

means for opening a lot to bidding by said customers across said network at a predetermined time;

means for automatically closing said lot from bidding in response to bidding activity for said lot.

3. The system of claim 1 wherein said auction manager includes:

means for adjusting said information contained in said merchandise database.

4. The system of claim 1 wherein said adjusted information is a minimum price set for said lot.

* * * * *